April 27, 1948.  B. E. ROETHELI  2,440,525
DEHYDROGENATION OF HYDROCARBONS
Filed June 24, 1944
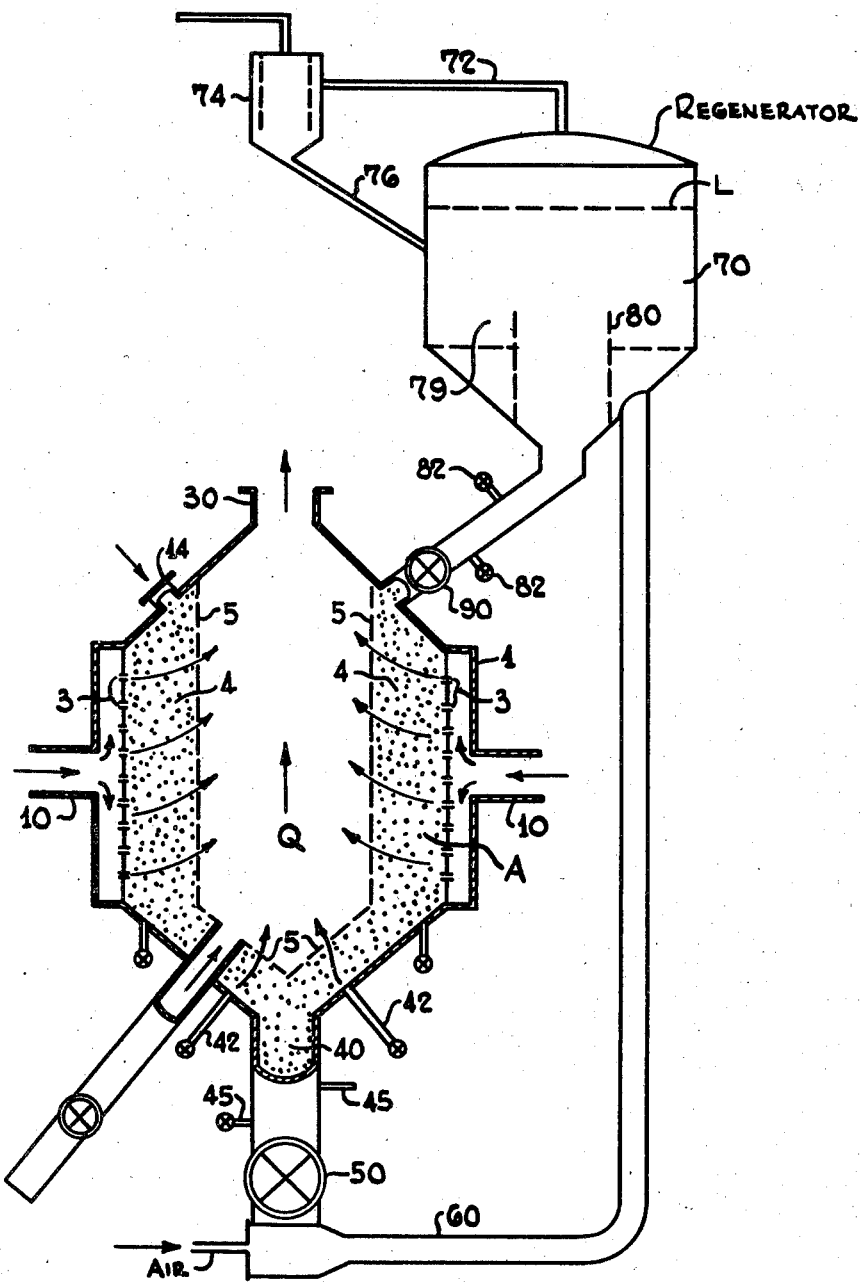
Bruno E. Roetheli  Inventor
By _____ Attorney Patented Apr. 27, 1948

2,440,525

UNITED STATES PATENT OFFICE 2,440,525

DEHYDROGENATION OF HYDROCARBONS

Bruno E. Roetheli, Cranford, N. J., assignor to Standard Oil Development Company, a corporation of Delaware Application June 24, 1944, Serial No. 541,918

10 Claims. (Cl. 260—683.3)

The present invention relates to the novel features hereinafter disclosed in the specification and claims considered in connection with the accompanying drawing.

It is now a well-known fact that synthetic rubber and/or rubber substitutes may be manufactured by causing a chemical union between the substance known as butadiene and the material called styrene. When these materials are copolymerized under proper conditions they form a product suitable for a number of uses such as in the manufacture of tires for automobiles for which formerly natural rubber had been used. The production of the co-polymer, however, on a large scale has necessitated the production of large quantities of both the intermediates, namely, butadiene and styrene.

Prior to my invention others had devised methods for producing both butadiene and styrene by dehydrogenation of butene and ethyl benzene, respectively. However, insofar as I am aware these processes have been conducted employing a stationary bed of catalyst which necessitates periodic discontinuance of the onstream operation to revivify the catalyst, because during the dehydrogenation the said catalyst becomes contaminated with deposits which seriously impair its activity.

I have devised a process which may be operated continuously, which permits very short contact times (down to a fraction of a second), which provides suitable means for the transfer and utilization of heat in the system in an economical manner and is otherwise a desirable process.

In the accompanying drawing, I have shown diagrammatically an apparatus layout in which a preferred modification of my invention may be carried into practical effect.

I shall describe the dehydrogenation of butene to form butadiene, and in so doing shall refer to the drawing, but it is to be distinctly understood that the process I have chosen to illustrate my invention is purely illustrative and my invention is not limited to butene dehydrogenation but includes all processes where the essential requirement is that the reaction takes place in gasiform or vapor state and that for best results only very short contact times are permissible. Therefore, referring to the drawing 1 represents a reactor which, as can be seen, consists essentially of a vessel having a conical base and upper section. Disposed within the reactor are foraminous members 5 which may be ordinary screens having a mesh size conforming to the size of the catalytic particles used. Into the reactor, preferably at juxtaposition points 10, I introduce the butene in a preheated condition, say at a temperature of around 500° F. to 1200° F., and simultaneously into the annular space defined by the screens 3 and foraminous members 5, I introduce a hot powdered catalyst which may be, say, a VI group metal oxide such as chromium oxide or molybdenum oxide, either alone or supported on a suitable support such as activated alumina, zinc spinel ($ZnAlO_4$), silica gel, or any other spacing or extending agent.

The catalyst has a size of from 500 mesh to one-half inch, preferably between the limits of 100–400 mesh.

The preheated butene feed enters the reactor at 10 and is distributed by the orifices 3 throughout the mass of catalyst. While the butene flows initially in a horizontal direction, nevertheless after it has entered the annular space 4 it acquires an upward flow component which causes the catalyst to be fluidized, so to speak, or in other words, formed into a sort of dense phase suspension wherein the catalyst is in the form of a swirling, ebullient, highly agitated mass thoroughly mixed and contacted with the flowing butene feed. By limiting the horizontal distance between the orifices 3 and screen 5 and controlling the velocity of the incoming butene feed, I may control the contact time or the residence time of the butene feed in the annular catalyst space to within the limits of from ½ to 4 seconds. This is an essential feature of the invention, for it is known that where as here, the dehydrogenation is operated at above atmospheric pressure, the nascent butadiene formed by dehydrogenation of butene tends to polymerize with itself or with the unreacted butene to form undesired polymers with a consequent loss in yield of the desired butadiene.

As indicated by the flow arrows in the drawing, the reaction products are discharged from the annular space A containing the catalyst into the central space Q which is a quenching gas or liquid, such as cold flue gas, hydrocarbon oil, water, $CO_2$, $N_2$, or any other suitable cooling medium. It is desirable to add sufficient quenching medium to cool the products issuing from the annular space A into Q to a temperature of, say, 900° F. to 1000° F., in the case of butadiene, for by so operating the danger of degradation of desired products is substantially obviated. The reaction products, together with the quenching medium, are withdrawn from the reactor through a line 30. I deem it unnecessary to describe the method of purifying and collecting the crude reaction products for this has been fully described in the patent to Kleiber et al., No. 2,414,816, dated January 28, 1947, and the purification method described therein or any other suitable means may be used.

As hereinbefore indicated, the contact of the catalyst with the reactants causes the deposition on the said catalyst of tarry and/or coky material which impairs the activity of the catalyst and necessitates the revivification of the catalyst. The most convenient method of restoring catalyst activity is to burn off the contaminants, and toward this end, the catalyst is continuously withdrawn through a standpipe 40 in communication with the conical base of the reactor, as shown in the drawing. As it discharges into the standpipe, the catalyst is subjected to the stripping action of gas distributed through pipe 42 for the purpose of dislodging therefrom occluded butene and/or butadiene. Furthermore, to facilitate flow of the catalyst material in the standpipe 40, the same is preferably provided with a plurality of taps 45 through which a fluidizing gas, such as steam or the like, may be discharged in order to increase the fluidity of the said downflowing catalyst material. The downward flow of material is controlled by the operation of a valve 50 which may be, for instance, a slide valve. The catalyst material discharges into a pipe 60 into which air is introduced, as shown, and the catalyst material is then conveyed pneumatically to a regenerator 70 where the catalyst in contact with the air undergoes regeneration. Within the regenerator 70 the superficial velocity of the air is controlled within the limits of from 1-5 ft. per second, say 1⅔ ft., so as to form a dense phase suspension having an upper level at L. Above L the gas is substantially depleted of catalyst and the regeneration fumes therein are withdrawn through line 72, passed through one or more cyclone separators 74 in which the last traces of catalyst may be removed and returned via pipe 76 to the main body of catalyst in 70.

The conditions for regenerating the catalyst are well known. For instance, the temperature should be of the order of 1200° F. to 1400° F. or thereabouts, the pressure may be either atmospheric or a few pounds thereover, and the residence time may be a matter of a few seconds to several minutes.

The regenerated catalyst is then withdrawn by gravity through a draw-off well 79 and pipe 80 containing a number of taps 82 into which an aerating or fluidizing gas, such as $CO_2$, flue gas, or the like, may be discharged for the dual purpose of facilitating the flow of catalyst and purging or dislodging occluded or admixed oxygen. The pipe 80 is provided with a flow control valve 90 for controlling the flow of catalyst into the annular space A.

A second regenerator similar to 70 may be positioned above catalyst inlet 14, similar in all respects as to design and operation as regenerator 70, so that the catalyst may be discharged into the reactor at two points thereof; or, the pipe 80 may have several branches each in communication with the space A at different points. It is an important feature of my invention that a substantial portion of the heat necessary to support the endothermic reaction of dehydrogenation is supplied by means of the hot catalyst recovered from the regenerator by using a high catalyst to feed ratio, say from 2-50 lbs. of catalyst per pound of feed gas. I may then supply a major portion of the total heat required to maintain the reaction in the dehydrogenation reactor.

As I have previously indicated my process is applicable not only to the dehydrogenation of butenes, pentanes, pentenes, $C_6$ hydrocarbons and other volatile gasoline components, but also to the dehydrogenation of styrene, paraffins, or to any chemical reaction where it is necessary and/or desirable to control the residence or contact time and limit the same to a very low value, such as a fraction of a second. Another important chemical reaction which may be satisfactorily carried out according to my improvements involves the decomposition of natural gas at temperatures of from 1800° F. to 2200° F., in the presence of a solid refractory powdered material, such as Carborundum, from which process gasoline, diolefins, and various aromatics, including aromatics containing more than one benzene ring in a condensed nucleus, are obtained. In the design which I have shown, the initial direction of flow of the reactants through the fluidized mass of catalyst is of course horizontal, but in the normal operation of the reactor the flowing gases do acquire a vertical component owing to density differentials obtained. This results in the exertion of upward forces on catalyst particles and serves to maintain a fluidized state.

While I prefer to use a catalyst size of from 200–400 mesh, I may, however, by proper adjustment of the flow velocity in the annular space A employ catalyst having a particle size up to one-half inch.

I deem the following to be the major advantages of my present invention:

(1) Flexible means providing short contact time between catalyst and reactants at high temperatures.

(2) The avoidance of the necessity of operating under high vacuum to prevent undesired side reactions.

(3) The provision of means for accomplishing quenching of the product from the reaction zone.

(4) Uniform utilization of heat of combustion of contaminating carbon to support the main reaction.

(5) Continuity of operation.

(6) Use of a catalyst in the reaction zone regardless of its stability, or lack of it, in the presence of steam, for the process may be operated in its preferred modification without diluting the reactants with steam to lower the partial pressure of the latter.

Numerous modifications of my invention will suggest themselves to those who are familiar with this art.

What I claim is:

1. A continuous method for conducting, at elevated temperatures, a hydrocarbon vapor phase reaction accompanied by decomposition of carbonaceous residue, which comprises discharging a hydrocarbon vapor horizontally into a downflowing fluidized mass of solid catalytic particles in a reaction zone, said fluidized mass having an annular form, adjusting the horizontal velocity of the vapor with a vertically upward flow direction component as the vapor travels through the fluidized mass of solid catalytic particles for a limited horizontal distance to limit the contact time, withdrawing a resulting vapor reaction product upwardly from said fluidized mass, immediately quenching the withdrawn vapor product by admixing therewith an upwardly flowing stream of a gaseous cooling medium, removing solid catalytic particles continuously from the reaction zone, burning carbonaceous material from the removed solid catalytic particles with an oxygen-containing gas in a regeneration zone, and returning regenerated solid catalytic particles while still hot from the regeneration zone to the reaction zone.

2. The method of claim 1, in which the hydrocarbon vapor discharged into the fluidized mass is a mono-olefin vapor and in which the solid catalytic particles catalyze dehydrogenation of the mono-olefin.

3. The method of claim 1, in which the hydrocarbon vapor discharged into the fluidized mass is a paraffin vapor and the solid catalytic particles catalyze dehydrogenation of the paraffin.

4. The method of claim 1, in which the solid catalytic particles are withdrawn from the reaction zone by gravity, are conveyed pneumatically to the regeneration zone at a high point of elevation, and thereafter are returned to the reaction zone by gravity flow from the regeneration zone.

5. A continuous method for dehydrogenating a paraffin in vapor phase, which comprises continuously discharging vapor of the paraffin to be dehydrogenated into a fluidized mass of a dehydrogenation catalyst within a reaction zone, said fluidized mass of catalyst having an annular form, adjusting the velocity of the vapor with horizontal and vertically upward flow direction components through the fluidized mass of catalyst within the reaction zone so as to limit contact between the vapor and catalyst within the range of from ¼ to 4 seconds' residence time, withdrawing a dehydrogenated paraffin vapor product upwardly from said fluidized mass of catalyst, immediately quenching said withdrawn product in an upwardly flowing admixed stream of gaseous cooling medium, withdrawing catalyst continuously from the reaction zone, regenerating the catalyst withdrawn from the reaction zone by contact with an oxygen-containing gas in the regeneration zone, and returning regenerated catalyst while still hot from the regeneration zone to the reaction zone.

6. The method set forth in claim 5, in which the paraffin is contained in a natural gas charging stock, the catalyst is a refractory solid dehydrogenation catalyst, and further in which the temperature maintained in the reaction zone is from 1800° F. to 2200° F.

7. The method set forth in claim 5, in which the paraffin to be dehydrogenated is ethane.

8. The method set forth in claim 5, in which the paraffin to be dehydrogenated is propane.

9. The method set forth in claim 5, in which the paraffin to be dehydrogenated is a component of gasoline.

10. The method set forth in claim 1, in which substantially atmospheric pressure is maintained in the reaction zone.

BRUNO E. ROETHELI.

REFERENCES CITED

The following references are of record in the file of this patent:

UNITED STATES PATENTS

| Number | Name | Date |
|---|---|---|
| 1,823,895 | Gray | Sept. 22, 1931 |
| 1,905,383 | Huppke et al. | Apr. 25, 1933 |
| 1,922,918 | Winkler et al. | Aug. 15, 1933 |
| 1,984,380 | Odell | Dec. 18, 1934 |
| 2,079,935 | Frey | May 11, 1937 |
| 2,231,231 | Subkow | Feb. 11, 1941 |
| 2,265,837 | Harding | Dec. 9, 1941 |
| 2,303,717 | Arveson | Dec. 1, 1942 |
| 2,317,379 | Hemminger | Apr. 27, 1943 |
| 2,322,122 | Frolich et al. | June 15, 1943 |
| 2,325,516 | Holt et al. | July 27, 1943 |
| 2,326,258 | Schmidt et al. | Aug. 10, 1943 |
| 2,330,069 | Marshall | Sept. 21, 1943 |
| 2,370,797 | Kearby | Mar. 6, 1945 |
| 2,378,342 | Voorhees | June 12, 1945 |

FOREIGN PATENTS

| Number | Country | Date |
|---|---|---|
| 533,037 | Germany | Aug. 27, 1931 |